(12) United States Patent
Carraway

(10) Patent No.: US 11,184,734 B1
(45) Date of Patent: Nov. 23, 2021

(54) USING GEOFENCING AREAS TO IMPROVE ROAD SAFETY USE CASES IN A V2X COMMUNICATION ENVIRONMENT

(71) Applicant: T-Mobile USA, Inc., Bellevue, WA (US)

(72) Inventor: Precia Carraway, Tukwila, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 16/997,861

(22) Filed: Aug. 19, 2020

(51) Int. Cl.
*H04W 4/021* (2018.01)
*H04W 4/40* (2018.01)
*H04W 4/90* (2018.01)
*H04W 92/18* (2009.01)

(52) U.S. Cl.
CPC ............ *H04W 4/021* (2013.01); *H04W 4/40* (2018.02); *H04W 4/90* (2018.02); *H04W 92/18* (2013.01)

(58) Field of Classification Search
None
See application file for complete search history.

(56) References Cited

U.S. PATENT DOCUMENTS

| | | | |
|---|---|---|---|
| 6,958,707 B1 | 10/2005 | Siegel | |
| 8,068,808 B2 | 11/2011 | Smith | |
| 8,260,485 B1* | 9/2012 | Meuth | G06Q 10/04 701/26 |
| 9,594,373 B2 | 3/2017 | Solyom et al. | |
| 9,961,507 B1* | 5/2018 | Mendelson | H04W 48/10 |
| 10,274,326 B1* | 4/2019 | Stewart | H04L 67/18 |
| 10,795,380 B1* | 10/2020 | Patton | G01C 21/20 |
| 2004/0077362 A1* | 4/2004 | Chinomi | H04W 76/40 455/456.5 |
| 2012/0242511 A1 | 9/2012 | Morgan et al. | |
| 2017/0142316 A1* | 5/2017 | Bohlander | G06F 3/167 |
| 2019/0286793 A1* | 9/2019 | Patton | G06F 21/554 |
| 2019/0347809 A1* | 11/2019 | Sato | G06K 9/00771 |
| 2019/0380020 A1* | 12/2019 | Pellegrini | H04W 4/021 |
| 2020/0077250 A1* | 3/2020 | Gideon, III | H04W 4/029 |
| 2020/0209002 A1* | 7/2020 | Hou | G05D 1/0221 |
| 2020/0314623 A1* | 10/2020 | Pellegrini | G06F 16/29 |
| 2020/0346751 A1* | 11/2020 | Horelik | A61K 31/137 |
| 2021/0006961 A1* | 1/2021 | King-Berkman | H04W 76/50 |
| 2021/0044673 A1* | 2/2021 | MacGabann | H04L 67/28 |
| 2021/0076186 A1* | 3/2021 | Beemer | H04L 67/12 |
| 2021/0192422 A1* | 6/2021 | Gutsol | H04W 4/023 |
| 2021/0200826 A1* | 7/2021 | Schuler | G06F 16/9536 |

* cited by examiner

*Primary Examiner* — Ernest G Tacsik
(74) *Attorney, Agent, or Firm* — Han Santos, PLLC

(57) ABSTRACT

Techniques are described herein for improving road safety use cases in a vehicle-to-everything (V2X) communication environment. The techniques include assigning of a plurality of calculated/precalculated geofencing areas on a projected path of a responding emergency vehicle. With the assigned geofencing areas, a remote management network such as a V2X communications server may identify the V2X components (user equipment, traffic lights, vehicle embedded devices, etc.) and send notifications to the identified V2X components in each assigned geofencing area and at different timing periods. The identification of the V2X components and the sending of the notifications at different timing periods improve the traffic awareness between the V2X components in the V2X communication environment.

20 Claims, 5 Drawing Sheets

US 11,184,734 B1

USING GEOFENCING AREAS TO IMPROVE ROAD SAFETY USE CASES IN A V2X COMMUNICATION ENVIRONMENT

BACKGROUND

Vehicle communication systems may include vehicle-to-everything (V2X) communication software or programs that can facilitate the transmission of information from a vehicle to any entity that may affect the vehicle and vice versa. V2X communication software generally resides at least partially in a memory unit of a vehicle's native computing system such as a vehicle's electronic control unit (ECU) and enables the vehicle to act as a communication node when communicating with various entities. For example, the vehicle can communicate with another vehicle through vehicle-to-vehicle (V2V) communications, the vehicle can communicate with traffic lights through vehicle-to-infrastructure (V2I) communications, and may establish communications with passengers and/or pedestrians through vehicle-to-pedestrian (V2P) communications.

Several innovative automotive use cases using V2X communication have emerged during the last years and many more will come in the following years. Some of the innovative automotive use cases include different safety-related V2X services such as autonomous driving, car platooning, control loss warning, forward collision warning, vehicle status warning, etc. With new features of connected vehicles, the automotive use cases may extend and adjust with continuous developments of these new features.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
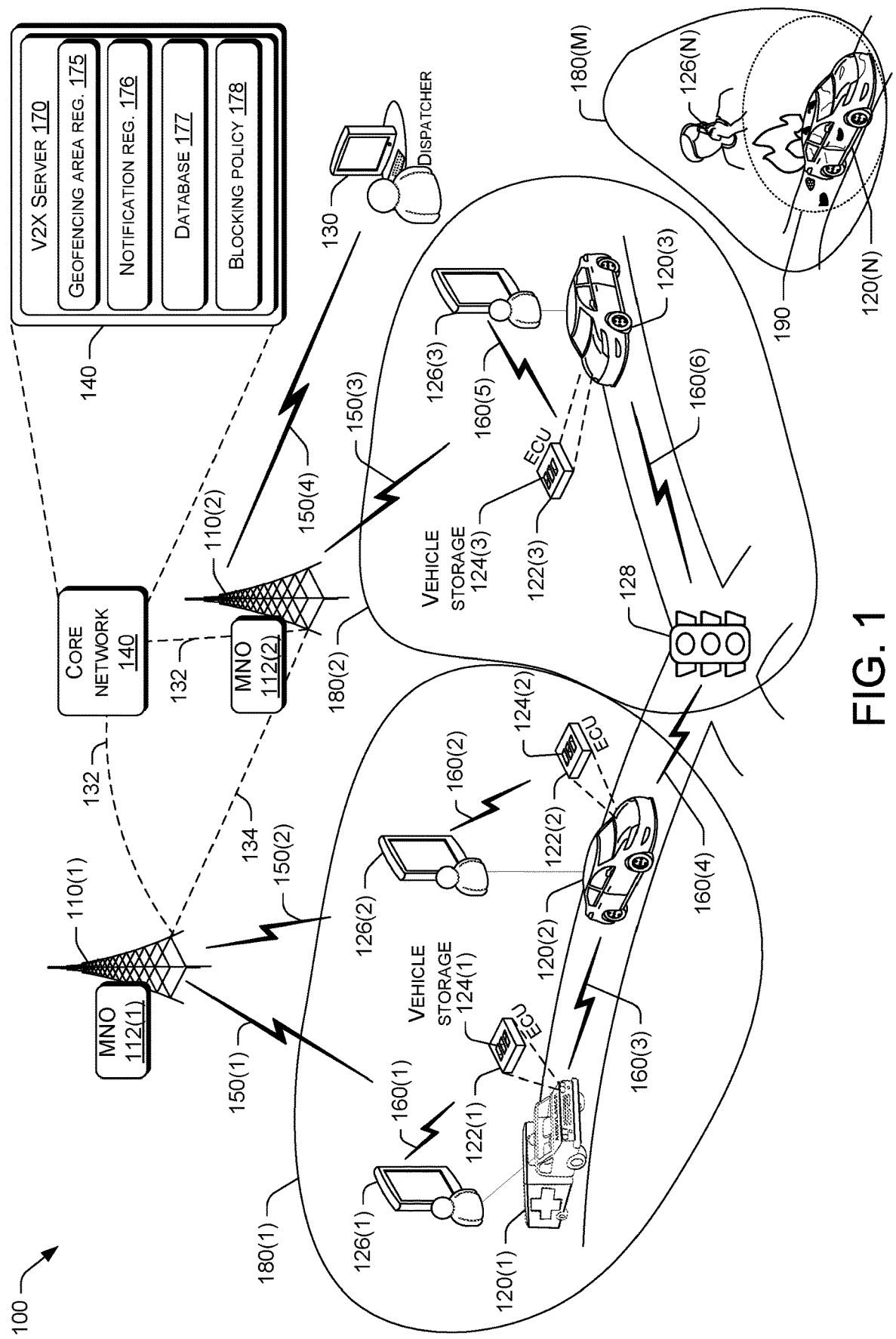
FIG. 1 illustrates an example of a network architecture that facilitates wireless communications between V2X components in a V2X communication environment.

This disclosure is directed to techniques for improving road safety use cases in a vehicle-to-everything (V2X) communication environment. Road safety use cases include road and traffic solutions that involve, for example, the sharing of locations and exchanging of data by V2X components through V2X communications to avoid collisions/accidents. A V2X communication environment may include a situation where the V2X components and a V2X server are interconnected through a cellular network, a broadband network, and/or through direct communication channels. The V2X components may include, but are not limited to, vehicles (with embedded devices) that are classified as emergency vehicles, private vehicles, motorcycles, etc., user equipment (UE), traffic lights, pedestrian warning signals, standalone paging stations, and similar devices that are capable of performing V2X communications. In various embodiments, centralized management of interplay between these V2X components improves the road safety use cases as described herein. The centralized management may be implemented, for example, by one of the V2X components, or it can be implemented by a remote management network such as the V2X server, which performs remote management over the V2X components. In example embodiments, the centralized management may guide the V2V communications between the vehicles (vehicle-embedded devices), V2P communications between the vehicle-embedded devices and pedestrian UE, V2I communications between the vehicle-embedded devices and the traffic lights, vehicle-to-network (V2N) communications between the vehicle-embedded devices and the V2X server, and/or guide other interactions between the V2X components. The guiding of interactions, for example, may take the form of effective identifications of the V2X components that can receive the notifications, which can be used as references for performing V2X communications.

For example, the V2X server may receive distress call information including a distress location of a car accident. The distress call information may be received from a manned/unmanned dispatcher station (e.g., "911" dispatcher) that encodes the reporting of an emergency (e.g., car accident). In this example, the receiving of the distress call information triggers a process in the V2X server (remote management network) that involves: relaying by the V2X server of the distress call information to the V2X component that is classified as an emergency vehicle; receiving, by the V2X server, of a location and a projected path of a responding emergency vehicle; assigning calculated/precalculated geofencing areas on the projected path of the responding emergency vehicle; identifying V2X components (e.g., UE, traffic lights, etc.) in the geofencing areas that overlap with the current location of the responding emergency vehicle and the distress location; identifying the V2X components in other geofencing areas when the responding emergency vehicle is within a threshold distance of the geofencing area that includes the V2X components to be identified; and sending of notifications to the identified V2X components. The threshold distance may include a minimum distance— between the responding emergency vehicle and a particular geofencing area—that triggers the identifying of the V2X components in the particular geofencing area. The notification may include information about the emergency response such as the current location and projected path of the responding emergency vehicle, alert messages to stay off the road, identifications and locations of other V2X components (e.g., traffic lights, pedestrian UE) in the same geofencing area, and the like.

In various embodiments, and before the sending of the notifications to the identified V2X components in the geofencing area that overlaps with the distress location, the V2X server may apply a policy to block the calls that originate from the geofencing area, which overlaps with the distress location. Alternatively, or additionally, the application of the policy does not block the calls but instead, the application provides an instruction for reporting another emergency or unrelated incident. For example, the instruction, which may be transmitted through a short message service (SMS) to the identified V2X components, can suggest an option of pressing another button such as "#" key in the UE to report an emergency other than the one that was reported. In this example, the caller may still access the dispatcher station by following the received instruction. As described herein, the geofencing areas may include a predefined set of virtual perimeter boundaries that are assigned on the projected path of the responding emergency vehicle.

In response to the receiving of the distress call information from the dispatcher station as described above, the V2X server searches its database for vehicles that are classified as emergency vehicles. The V2X server database may store information about the V2X components such as information about the vehicles that host the embedded devices, locations of UE that are detected through a telecommunication carrier core network, device identifications and locations of traffic lights, device identifications of the pedestrian warning system, etc. The V2X server then relays the distress call information to at least one vehicle that is classified as an emergency vehicle and in return, the V2X server receives the location and the projected path of the responding emergency vehicle. The location includes the current physical location while the projected path includes the route of the responding emergency vehicle from its current physical location going to the di stress location.

Based on the received location and the projected path, the V2X server may form and/or assign calculated/precalculated contiguous geofencing areas on the projected path of the responding emergency vehicle. The assigned contiguous geofencing areas may form a chain of adjacent circles or the like, with the first assigned geofencing area overlapping with the current location of the responding emergency vehicle and the last assigned geofencing area overlapping with the target destination (distress location). In example embodiments, the shape and size of an individual geofencing area is representative of a direct communication coverage area in V2X communications. The direct communication coverage area may include a zone where the V2X components can establish direct wireless communications using unlicensed or licensed bands. For example, the direct communication coverage area may extend to about 150 meters from the transmitting V2X component when the 5.9 GHz unlicensed band is used. In this example, the geofencing area may be configured to include a circular shape with a radius that is equal to or less than one-half of the direct communication coverage area. In this manner, the V2X components in the circular-shaped geofencing area may be able to establish V2X communications since they are in direct communication signal ranges with one another. The geofencing area may be configured to be circular in shape based on the assumption that V2X component antennas are omnidirectional, and the size of the circular-shaped geofencing area is within the limit of the direct communication signal range (e.g., 150 meters). However, different other geofencing area shapes (e.g., polygon) and sizes may be configured to conform with the size of the direct communication coverage area. Where a geofencing area is described as being "circular" or "circular-shaped" or the like, it should be understood that such other shapes are also contemplated.

For the geofencing areas in-between the first assigned geofencing area and the last assigned geofencing area, the V2X server utilizes the threshold distance as a reference for the timing of identifying the V2X components in these geofencing areas. The threshold distance may include the minimum distance—between the responding emergency vehicle and a particular geofencing area—that triggers the identifying of the V2X components in the particular geofencing area. In various embodiments, the threshold distance is at least one geofencing area away from an edge of the geofencing area that includes the V2X components to be identified. For example, the assigned geofencing areas include contiguous circular-shaped geofencing areas with an individual geofencing area radius of 50 meters (diameter of 100 meters). In this example, the threshold distance is at least one geofencing area away (which is about 100 meters) from the edge of the geofencing area that includes the V2X components to be identified. In this example still, the identifying of the V2X components is triggered when the incoming responding emergency vehicle crosses the boundary of the geofencing area that is adjacent to the particular geofencing area that includes the V2X components to be identified.

In example embodiments, vehicle-embedded device memory registers store vehicle data that includes information about the hosting vehicle, and the information about another vehicle, infrastructure, UE, and/or information of other V2X components within the V2X communications environment. The information about the hosting vehicle may include a vehicle identification number (VIN), a vehicle classification (e.g., emergency vehicle, civilian passenger vehicle) that is associated with the VIN, a current hosting vehicle's location, unique identifications of other devices that are in communication with the embedded device, and the like. Unique identifications of the other devices include device identification of the traffic light that is in V2I communications with the embedded device, a media access control (MAC) address of a laptop that is in vehicle-to-passenger communication with the embedded device, device identification of the UE that is in V2P communication with the embedded device, and the like. In example embodiments, the embedded device periodically broadcasts the stored vehicle data through the cellular network, broadband network, and/or through the direct communication channel to share the data with another V2X component and/or with other data stores, such as a network server (e.g., a centralized V2X server). Similarly, other V2X components such as traffic lights, UE, standalone paging devices, and the like, may periodically broadcast their respective device identifications and other information when exchanging data with another V2X component and/or the V2X server. The exchanging of data coupled with the received notifications from the V2X server may improve the road safety use cases as described herein.

In some embodiments, an embedded device includes a wireless communication electronic device that is integrated into a vehicle's platform as an electronic control unit (ECU) or as a portable computing system. The ECU may include onboard diagnostic (OBD) and telematic compute unit (TCU) that send the vehicle data to the V2X server and/or to another V2X component. The embedded device is associated with a particular vehicle that performs, for example, the V2X communication with another vehicle. In this example, the other vehicle may also include a separate device that is integrated into its platform. The device may include hardware circuit components that can process data, perform transmission and reception of data through a cellular network connection (cellular network), broadband network, telephonic network, an open network such as the Internet, a private network, the direct communication channel, or any combination thereof. Further, the device may be configured to be a subscriber of one or more mobile network operators (MNOs) or wireless telecommunications network service providers (WTNSPs). The subscription may be preconfigured during vehicle manufacture and can be adjusted from time to time such as, for example, when the device changes MNOs/WTNSPs and/or adds network subscription features. The subscription, for example, facilitates V2N communications between the device and the V2X server through the core network.

In an example configuration, the V2X communication may encompass two separate interfaces. V2X communication may use a first interface (cellular network interface) such as, for example, a Long Term Evolution (LTE) interface (Uu) for cellular network communications. V2X communication may also use a second interface (direct communication channel interface) such as, for example, an LTE V2X interface or new radio (NR) V2X interface (PC5 interface) for direct communications. The direct communication channel interface may utilize a shared spectrum such as the 5.9 GHz unlicensed band. In some embodiments, V2X communication may utilize both interfaces at the same time. For example, V2N communication may use a vehicle's cellular network connection in a traditional manner over the Uu, which can serve as a logical interface between the vehicle and a base station. At the same time, the vehicle may perform V2P communication with the pedestrian through the PC5 interface. In this example, the V2N communication over the Uu is independent of the V2P communication over the PC5 interface.

The techniques described herein may be implemented in a number of ways. Example implementations are provided below with reference to the following figures.

Example Network Architecture

FIG. 1 illustrates an example architecture of a wireless communications system such as an evolved packet system 100. The evolved packet system 100 may include base stations 110 that can be associated with MNO 112, vehicles 120 with integrated devices 122, vehicle storage 124, user equipment (UE) 126, a traffic light 128, a dispatcher station 130, and a core network 140 including a V2X server 170, which further includes geofencing areas register 175, notification register 176, a database 177, and a blocking policy 178. The hosting vehicles 120, devices 122, UE 126, traffic lights 128, and other similar devices such as a standalone paging station (not shown) are treated herein as the V2X components that are in communication with the V2X server 170. The V2X components may perform V2X communications with the V2X server 170 through a radio interface 150 (e.g., Uu interface). Each one of the V2X components may also establish and/or perform V2X communications with another V2X component through a direct communication channel interface 160 such as PC5 interface. Further, and as discussed in detail below, the V2X server 170 may assign contiguous calculated/precalculated geofencing areas 180 on a projected path/route of a responding emergency vehicle (e.g., vehicle 120(1)). The contiguous geofencing areas 180(1)-180(M) may cover an entire route, for example, of the responding emergency vehicle 120(1) from its current physical location going to a distress location 190.

In an example embodiment, the V2X server 170 receives distress call information including the distress location 190 from the dispatcher station 130. In response, the V2X server 170 performs a process that includes: applying the blocking policy 178 to prevent call congestion due to calls that are originating from the geofencing area 180(M), which overlaps with the distress location 190; receiving of a location and a projected path of the responding emergency vehicle 120(1); assigning geofencing areas 180 on the projected path of the responding emergency vehicle 120(1); identifying V2X components (e.g., UE, traffic lights, etc.) in the geofencing area or areas; and sending of notifications to the identified V2X components. The notifications to the identified V2X components may serve as guides to improve traffic awareness when performing V2X communications. The notifications may include information such as the occurrence of the incident at the distress location 190, current location and projected path of the responding emergency vehicle 120(1), detected V2X components within the geofencing area, suggested precautionary measures, and other similar information including expiration of the notification. As described herein, the emergency vehicle may include a firetruck, a police car, an ambulance, and the like.

Device 122 may include an electronic device that can be installed and/or integrated into a vehicle 120's computing system or platform. Device 122 may include hardware circuit components such as transceivers, microcontrollers, and memory components to establish V2X communication with the other V2X components through the cellular network (radio interface 150), direct communication channel (direct communication channel interface 160), or broadband network (not shown). In an example embodiment, device 122 includes the vehicle storage 124 that stores the vehicle data of the hosting vehicle and other vehicles. The devices 122 periodically broadcast their vehicle data to other V2X components through the direct communication channel interface 160. The devices 122 similarly transmit their vehicle data to the V2X server 170 through the radio interface 150. The V2X server 170 stores the vehicle data of vehicles 120 in the database 177, and may broadcast the vehicle data to the V2X components through the radio interface 150.

Vehicle storage 124 may include one or more memory register components that store information about the VIN of the hosting vehicle, vehicle classification that is associated with the VIN, current location, a target destination if the hosting vehicle is an emergency vehicle that is in active pursuit of an emergency, and the like. The vehicle storage 124 also stores information about the location and identifications of another vehicle, identification of wireless connected devices, and identification of infrastructures such as the device identification or subscriber identity module (SIM) of the traffic light 128. The VIN is unique for each vehicle, and the VIN may be associated with vehicle classifications such as an emergency vehicle, private vehicle, public utility vehicle, train, a semi with trailer, etc. In an example embodiment, the device 122 periodically broadcasts the data in the vehicle storage 124 through the V2X server 170 or through the direct communication channel interface 160 to alert another vehicle, pedestrian, passenger, or infrastructure. The V2X server 170 utilizes the base stations 110 to broadcast the vehicle data to the V2X components in the geofencing areas 180.

UE 126 may include or be embodied by a cellular phone, a smartphone, a session initiation protocol (SIP) phone, a laptop, a personal digital assistant (PDA), a satellite radio, a global positioning system (GPS), a multimedia device, a video device, a camera, a game console, a tablet, a smart device, a wearable device, or any other similar functioning device. UE 126 may also be referred to as a station, a mobile station, a subscriber station or unit, a wireless unit, a mobile device, a wireless device, an access terminal, a handset, a user agent, a mobile client, or some other suitable terminology. In some embodiments, the UE 126 may use the radio interface 150 to establish cellular network communications with the other V2X components such as the UE 126, device 122, and/or the traffic light 128. The UE 126 may also use the direct communication channel interface 160 to establish and to perform V2X communication with the other V2X components.

Traffic light 128 may include one or more signaling devices that can be positioned at road intersections, pedestrian crossings, and other locations to control flows of traffic. Traffic light 128 may include transceiver and processor components that are similarly found in other V2X components to establish V2X communications. The traffic light 128 may include unique device identification that can be broadcasted to the other V2X components and to the V2X server 170 during data exchange between the V2X components or between the V2X component and the V2X server. In example embodiments, the V2X server 170 stores or pre-stores the device identifications and associated locations of the traffic lights 128 in the database 177. Similarly, the V2X server 170 may store identified intersections or routes with no traffic lights. In this embodiment, the V2X server 170 may include in the notifications the device identifications and the corresponding locations of the traffic lights 128 in the geofencing areas 180. Further, the V2X server 170 may include in the notification the presence of crossing barriers such as train crossing barrier, "all-way stop" zones that include first stop-first go intersections, intersections having no traffic lights, and the like. These notifications may be used as references by the receiving V2X component when performing V2X communications with another V2X component.

V2X server 170 may include general-purpose computers or other electronic devices that are capable of receiving input, processing the input, and generating output data. V2X server 170 may provide an effective identification of the V2X components that may receive notifications, and integrated sending of the notifications that can be used by the receiving V2X components as references for V2X communication purposes. In some embodiments, the V2X server 170 may directly control the traffic lights 128 to pave the way for the incoming emergency vehicle 120(1). The V2X server 170 may utilize the radio interface 150 to communicate with the UEs 126, devices 122, traffic lights 128, and/or other V2X components in the geofencing areas 180. The V2X server 170 utilizes the registers 175-178 and other components (not shown) to improve the road-safety services in the V2X communications environment. Geofencing areas register 175 includes storage for calculated/precalculated geofencing areas 180. Notification register 176 includes storage for information that will be transmitted by the V2X server 170 to the V2X components. In some examples, the transmitted information to the V2X components may include an expiration so that the receiving V2X component is aware of the expiration from the time of receiving of the notification. For example, a notification with regard to a car accident may expire after three hours while a notification with regard to a house on fire may expire in ten hours. Database 177 includes storage for the data that are received from the V2X components. Blocking policy 178 may include rules that can be implemented by the core network 140 and/or the base station 110 to selectively block, for example, the calls that are originating from the geofencing area 180(M), which overlaps with the distress location 190.

Geofencing areas 180 may include a pre-defined set of virtual perimeter boundaries that are assigned on the projected path of the responding emergency vehicle 120(1). In example embodiments, the assigned contiguous geofencing areas 180 resemble a chain of circular-shaped virtual perimeters between the current location of the responding emergency vehicle 120(1) up to the distress location 190. In this embodiment, each circular-shaped geofencing area 180 includes a diameter that is equal to or less than the direct communication channel coverage area to make sure that the V2X components in the individual geofencing area 180 will be able to perform V2X communications using the direct communication channel interface 160. Further, the center of the circular-shaped geofencing area 180 is centered along the route of the projected path. For example, the direct communication channel transmission range for the 5.9 GHz unlicensed band is about 150 meters. In this example, each circular-shaped geofencing area 180 may include a radius of about 75 meters or less to make sure that the V2X components in the geofencing area 180 will be able to perform V2X communications.

Base stations 110 in the evolved packet system 100 may be collectively referred to as Evolved Universal Mobile Telecommunications System (UMTS) Terrestrial Radio Access Network (E-UTRAN) that can be connected to the core network 140 through backhaul links 132 (e.g., S1 interface). Base stations 110 may perform the transfer of user data including voice, video, and messaging in general. Base stations 110 may perform mobility control functions such as handover and dual connectivity, inter-cell interference coordination, connection setup and release, load balancing, distribution for non-access stratum (NAS) messages to UEs, NAS node selection, paging, positioning, delivery of warning messages, and detecting of current locations of devices 122, UEs 126, and/or the traffic lights 128. Further, base stations 110 may communicate directly or indirectly with each other over a backhaul link 134 (e.g., X2 interface). The backhaul link 134 may be wired or wireless.

MNO 112 may include a provider of wireless communications services to an end-user including radio spectrum allocation, wireless network infrastructure, and the like. MNO 112 may own/control access to the radio spectrum license, and control elements of the wireless network infrastructure that are necessary to provide the wireless communications services to subscribers (e.g., device/UE subscribers).

Radio interface 150 may include the network interface that facilitates cellular network communications between the base station 110 and the V2X components and/or dispatcher station 130. The radio interface 150 may serve as a communication link between the V2X server 170 and the V2X components. Radio interface 150 may use one or more licensed bands of the associated MNO 112. For example, the base station 110 is associated with the MNO 112 that owns a radio spectrum license including 28 GHz/39 GHz high band, 2.5 GHz/3.5 GHz mid-band, or 600 MHz/700 MHz low band. In this example, the base station 110 may use the different licensed bands in the radio interface 150 during uplink (UL) and/or downlink (DL) transmissions between the base station 110 and the V2X components. The UL transmissions may be used to transmit data from the vehicle storage 124 to the V2X server 170, while the DL transmissions can be used by the V2X server 170 to send the notifications to the V2X components.

Core network 140 may include one or more core network nodes that provide core network services to the V2X components, dispatcher station 130, and other similar devices (not shown). Core network 140 may be an evolved packet core (EPC) network or a 5G core network, or other core networks that can facilitate the detection of UE 126, devices 122, and traffic light 128 locations through cell tower localization. Core network 140 further facilitates data communications between network-connected V2X components and the V2X server 170. In example embodiments, the core network 140 may use the home subscriber server (not shown) and other components to implement the blocking policy 178. For example, the home subscriber server includes the master database to support call control, to store subscription profiles, authenticate UEs 126, and to control the services that may be associated with the authenticated UEs 126. In this example, the V2X server 170 may utilize the home subscriber server and other components of the core network 140 to implement the blocking policy 178. In other cases, the base station 110 or the UEs 126 may be configured to implement blocking policy 178. For example, the UE 126 includes an installed application that allows or blocks traffic towards the dispatcher station 130. Similarly, the base station 110 may implement the blocking policy 178 by allowing or blocking the calls that are originating from the geofencing area 180(M).

Direct communication channel interface 160 may include a direct wireless communication interface that can connect the UEs 126, devices 122, traffic lights 128, or a combination thereof, within a certain direct signal propagation range (e.g., within 120 meters of each other). Direct communication channel interface 160 may facilitate the transmission of voice, data, and other types of content through the use, for example, of the unlicensed band spectrum. For example, the direct communication channel interface 160 facilitates the exchange of vehicle storage 124 data between devices 122. In another example, the direct communication channel interface 160 facilitates V2V, V2I, and V2P communications between vehicle embedded devices, between the device and the traffic light, and between the device and the pedestrian, respectively.

Example Operation Scenarios

In example embodiments, the UE 126(N), which is located at the distress location 190, is utilized to report to the dispatcher station 130 the vehicle 120(N) accident at the distress location 190. The dispatcher station 130, which is representative of the manned/unmanned "911 emergency hotline," may encode a call timestamp (not shown) and the distress location 190 to form the distress call information. A call timestamp includes a recorded actual time of incident reporting by a user, while the distress location includes the place of incident. The formed distress call information is then transmitted to the V2X server 170 through the base station 112, through the broadband network, or through any other network. With the received distress call information, the V2X server 170 may parse the distress call information and relay the parsed distress call information to emergency vehicles that are located at or near the distress location 190. The V2X server 170, for example, uses the database 177 to identify the emergency vehicle-classifications of the vehicles. In response to receiving the location and the projected path from a responding emergency vehicle (vehicle 120(1)), the V2X server 170 assigns the contiguous calculated/precalculated geofencing areas 180 that resemble collectively a chain of circular-shaped virtual perimeters along the projected path/route of the responding emergency vehicle 120(1). For example, the distance between the current location of the responding emergency vehicle 120(1) and the distress location 190 is 1000 meters. In this example, the V2X server may assign eleven contiguous circular-shaped geofencing areas 180 with individual geofencing area radius of 50 meters. The eleven contiguous circular-shaped geofencing areas 180 may then generate a coverage area of 1100 meters, which is enough to cover the 1000 meters distance between the current location of the responding emergency vehicle 120(1) and the distress location 190.

With the assigned geofencing areas 180, the V2X server 170 identifies the V2X components in the geofencing area 180(1) and the geofencing area 180(M). The identification of the V2X components in the geofencing area 180(1) is performed to promote traffic awareness in the V2X components that are located near the responding emergency vehicle 120(1), while the identification of the V2X components in the geofencing area 180(M) is performed to inform the V2X components of the accident. With the identified V2X components in the geofencing areas 180(1) and 180(M), the V2X server 170 (processors) sends the notification to these identified V2X components.

For the geofencing areas 180(2) to 180(M−1), the V2X server 170 may utilize the threshold distance as reference for the timing of identifying of the V2X components in each one of these geofencing areas 180(2) to 180(M−1). In various embodiments, the threshold distance is at least one geofencing area away from an edge of the geofencing area that includes the V2X components to be identified. In this embodiment, the identification of the V2X components is triggered when the responding emergency vehicle 120(1) crosses the boundary of the geofencing area that is adjacent to the particular geofencing area that includes the V2X components to be identified. For example, the identification of the V2X components in the assigned geofencing area 180(10) (not shown) is triggered when the responding emergency vehicle 120(1) crosses the boundary of the adjacent geofencing area 180(9) (not shown) or the adjacent geofencing area 180(11) (not shown) when the responding emergency vehicle 120(1) is coming from the other direction. In this example, the identifying of the V2X components in the geofencing area 180(10) is triggered when the responding emergency vehicle 120(1) is considered to be at least one geofencing area away from the edge of the geofencing area 180(10). Where the geofencing areas are described as being "contiguous," it should be understood that such other configurations are also contemplated. For example, the assigned geofencing areas 180(9) and 180(10) are not contiguous but the threshold distance that triggers the identification of the V2X components of either geofencing area is still the same. That is, the identification of the V2X components in the geofencing area 180(10) is triggered when the responding emergency vehicle 120(1) is at least a geofencing area-diameter away (e.g., 150 meters) from the geofencing area 180(10).

Figure 2:
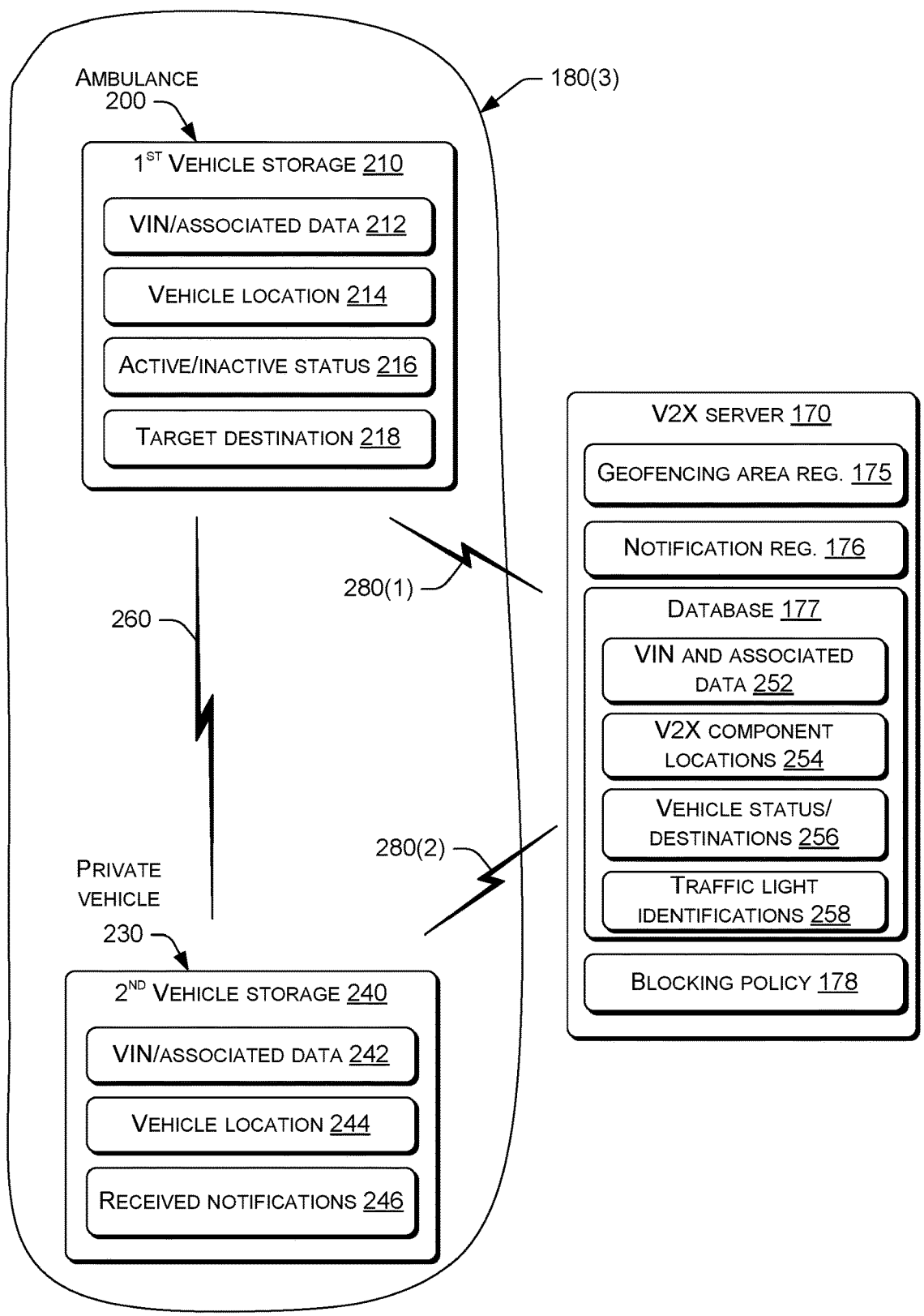
FIG. 2 is a block diagram showing an exchange of vehicle storage data between V2X components and a V2X communications server (hereinafter referred to as V2X server for brevity).

FIG. 2 is a block diagram showing an exchange of vehicle storage data and interaction between the V2X components (vehicle-embedded devices) in the same geofencing area. FIG. 2 shows a first vehicle 200 including a first vehicle storage 210, a second vehicle 230 including a second vehicle storage 240, and the V2X server 170 including the geofencing areas register 175, notification register 176, database 177, and the blocking policy 178. Database 177 further includes memory register components that store "VIN and associated data 252," V2X component locations 254, vehicle status and destinations 256, and traffic light identifications 278. The first vehicle storage 210 may include memory registers that store first vehicle "VIN and associated data 212," a first vehicle location 214, an active/inactive status 216, and a first vehicle target destination 218. The second vehicle storage 240 may store information such as the second vehicle "VIN and associated data 242," second vehicle location 244, and received notifications 246. The first vehicle 200 and the second vehicle 230 may exchange vehicle storage data from their respective embedded-devices through a PC5 interface 260 while the V2X server 170 may communicate with the embedded devices of the first vehicle 200 and/or the second vehicle 230 through a Uu 280. The data that is stored in the vehicle storages are for illustration purposes and additional information or data may be added without affecting the embodiments as described herein.

"VIN and associated data 212/242" may store information such as the unique VINs that are associated with international mobile subscriber identity (IMSI) numbers of the corresponding devices that are embedded in the first vehicle 200 and the second vehicle 230, respectively. In this case, each IMSI may be associated with the unique VIN, which can be used to identify the vehicle classification (e.g., emergency vehicle, private vehicle, public vehicle), make, build, and other information. "VIN and associated data 212/242" may further store vehicle information such as vehicle models, colors, and build. In an example embodiment, the first vehicle 200 and the second vehicle 230 periodically transmit the data in their respective "VIN and associated data 212/242" to the V2X server 170 to update the database 177 and particularly, to update the "VIN and associated data 252" that stores the VINs and associated data from the V2X components in the V2X communications environment.

Vehicle locations 214/244 may store information such as current locations of the first vehicle 200 and the second vehicle 230. The first vehicle 200 and the second vehicle 230 may use their respective Global Positioning System (GPS) or other navigation mechanisms to detect their current physical locations. Particularly, the first vehicle 200 (e.g., ambulance) may use its GPS and/or installed geolocation tracking application (e.g., Google map) to track its location at different portions of the projected path when responding to an emergency. In an example embodiment, the first vehicle 200 and the second vehicle 230 periodically transmit the data from their respective "vehicle locations 214/244" to update the database 177 and particularly, the V2X component locations 254. In this embodiment, the V2X server 170 may utilize the data in the V2X component locations 254 to identify and to estimate the number of V2X components in the geofencing area 180. In other scenarios, the V2X server 170 may not receive current physical locations of unrecognized V2X components, or the V2X server 170 fails to update its V2X component locations 254 with regard to some V2X component within a particular geofencing area such as in the illustrated geofencing are 180(3). In this case, the first vehicle 200 and the second vehicle 230 may utilize the PC5 interface 260 in sending notifications that include their respective proximate locations. For example, the first vehicle 200 utilizes its radar, Lidar, camera system, or other measuring sensor to detect its proximate location from the second vehicle 230 that is located along the projected path of the first vehicle 200. In this example, the first vehicle 200 may broadcast its proximate location and other vehicle storage 210 data to the second vehicle 230 via the PC5 interface 260. In this regard, the second vehicle 230 is aware of the first vehicle 200's presence even though the V2X server 170 failed to send the notifications as described herein.

Active/inactive status 216 may include information that indicates whether the first (emergency) vehicle 200 is actively pursuing an emergency. Active/inactive status 216, for example, may include a "high" bit when the emergency—first vehicle 200 is about to attend to an emergency. In this example, a user may further enter a target destination in the target destination 218 where the target destination can be used to estimate the projected path or route of the emergency—first vehicle 200. In an example embodiment, the emergency—first vehicle 200 periodically broadcasts updated active/inactive status 216 to the V2X server 170 to update the database 177. Particularly, the "vehicle status and destinations 256" are updated to include the emergency vehicle status of the emergency vehicle. In various embodiments, the V2X server 170 relays the distress call information to vehicles that are classified as emergency vehicles with an inactive status. That is, the emergency vehicle is available to attend to the emergency.

Received notifications 246 may include the notifications that are received from the V2X server 170. For example, the received notifications 246 include classification and current location of the responding emergency vehicle, projected path of the responding emergency vehicle going to its target destination, assigned geofencing areas, particular geofencing area that covers the current location of the private vehicle 230 or the emergency vehicle, number and/or positions of nearby V2X components and the like. In an example embodiment, the second vehicle 230 periodically receives the notifications from the V2X server 170. Alternatively, or additionally, the second vehicle 230 may receive the notifications directly from the first vehicle 200 via the PC5 interface 260.

In various embodiments, such as when the notifications were already transmitted to the V2X components in the geofencing area 180(3), for example, the first vehicle 200 (emergency vehicle) uses the PC5 interface 260 to broadcast its vehicle storage 210 data to alert the second vehicle 230 of its presence. In this embodiment, the second vehicle 230 receives the broadcasted vehicle storage 210 data and may adjust its V2X communication configuration to render road-safety services. For example, the adjustment in the V2X communication configuration of the second vehicle 230 includes initiating and establishing V2V communication with the (emergency) first vehicle 200. The established V2V communication may be used for car platooning, autonomous driving, and the like. In this example, the advance notifications from the V2X server 170 and the exchange of data between the first vehicle 200 and the second vehicle 230 improves the traffic awareness between the two vehicles. Given a situation where the V2X server 170 fails to update its database 177 with regard to the vehicle storage 210 data of the first vehicle 200, then the second vehicle 230 may directly receive the vehicle storage 210 data that is broadcasted by the first vehicle 200 via the PC5 interface 260. The second vehicle 230 may then adjust its V2X communication configuration as illustrated in the example above.

In various embodiments, the V2X server 170 may also include in the transmitted notifications information from other identified V2X components such as the traffic light identifications 258 and the associated locations of these traffic lights. In this embodiment, the first vehicle 200 and/or the second vehicle 230 may use this information to establish V2I communications with the traffic light. In other embodiments, the V2X server 170 directly sends control signals to the traffic lights (not shown) that are configured to establish communications with the V2X server 170 through the Uu 280.

Figure 3:
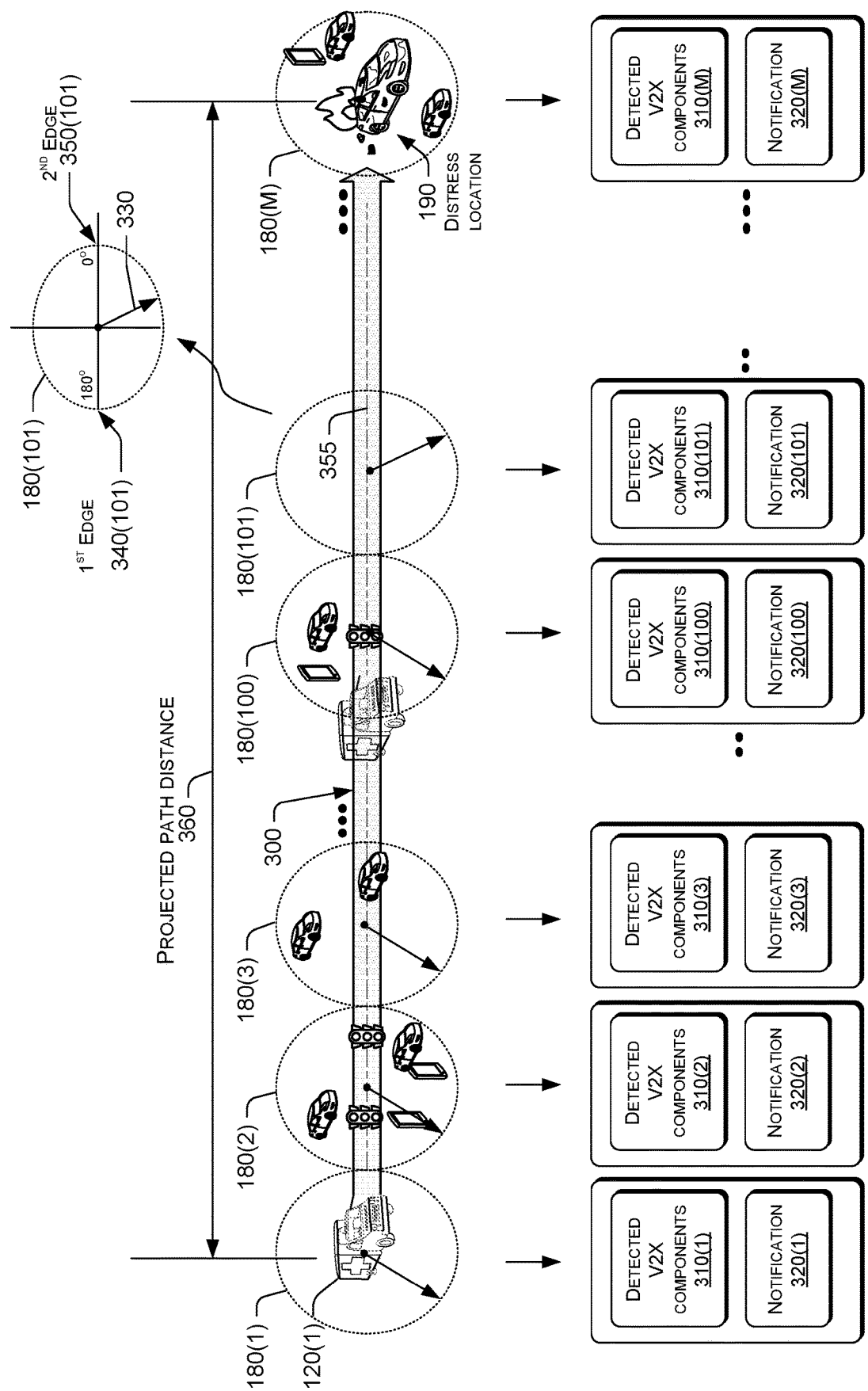
FIG. 3 is a block diagram showing assigned geofencing areas on a projected path of a responding V2X component that is classified as an emergency vehicle.

FIG. 3 is a block diagram showing the assigned contiguous geofencing areas 180(1)-180(M) on a projected path 300 of the responding emergency vehicle 120(1) to improve the road safety use cases as described herein. Each one of the assigned geofencing areas 180 may be associated with the detected number of V2X components 310 and notifications 320. The geofencing area 180 may include a circular shape with a radius 330, a first edge 340, and a second edge 350. For contiguous geofencing areas, the first edge 340 and the second edge 350 may define the boundaries between two adjacent geofencing areas. For example, the first edge 340 (101) may define the boundary between the geofencing areas 180(100) and 180(101), while the second edge 350(101) may define the boundary between the geofencing areas 180(101) and 180(102). Further, the center of the circular-shaped geofencing area 180 may lie on a centerline 355 of the projected path 300. The geofencing areas 180 are assigned contiguously to cover a projected path distance 360. The projected path 300 is presented as a straight line for simplicity—although a projected path 300 may be nonlinear, e.g., to avoid environmental or other obstructions, and the projected path 300 may include intersections (not shown), side roads for pedestrians (not shown), and the like. Further, the geofencing area 180 is configured to be circular in shape on the assumption that the V2X component antennas are omnidirectional. Different other shapes may be configured without affecting the embodiments described herein.

In various embodiments, the V2X server 170 receives the current location, projected path 300 and the projected path distance 360 of the responding emergency vehicle 120(1). The responding emergency vehicle 120(1), for example, may utilize its GPS features to derive its current location, to obtain the projected path 300 upon entering of a target destination such as the distress location 190, and to obtain the estimated projected path distance 360. With the received projected path distance 360, the V2X server 170 may assign the contiguous circular-shaped geofencing areas 180 whose corresponding center points are positioned to be colinear with the centerline 355 in the projected path 300. The V2X server 170 may calculate the size of the geofencing areas 180, and map the calculated geofencing areas 180 to the projected path 300. In other cases, the geofencing areas 180 are already precalculated and stored in the V2X server 170. In this case, the V2X server 170 may retrieve the stored geofencing areas 180, and map the retrieved geofencing areas 180 to the projected path 300. In example embodiments, the area that is covered by an individual circular-shaped geofencing area 180 may be based upon the direct communication coverage area in V2X communications. For example, the signal transmission range for the use of 5.9 GHz unlicensed band is about 150 meters. In this example, the radius 330 of the individual geofencing area 180 is about 75 meters (150 meters divided by 2=75 meters) or less. To ensure connectivity through the direct communication channel, the radius 330 of the individual geofencing area 180 may be configured to be less than 75 meters (e.g., 50 meters).

After the assigning of the contiguous geofencing areas 180, the V2X server 170 may identify the V2X components in each geofencing area 180. In various embodiments, the V2X server 170 identifies first the V2X components in the first geofencing area 180(1) and the last geofencing area 180(M) that overlaps with the current location of the responding emergency vehicle 120(1) and the distress location 190, respectively. In this embodiment, the sending of the notification 320(1) to the geofencing area 180(1) may improve traffic awareness among the detected V2X components 310(1), which are located near the responding emergency vehicle 120(1). Similarly, the sending of the notification 320(M) to the geofencing area 180(M) may improve traffic awareness among the detected V2X components 310(M), which are located near the car accident. As described above, the V2X server 170 may use the sending of the notification 320(M) for lifting of the applied blocking policy 178.

For the geofencing areas 180(2) to 180(M-1), the V2X server 170 may utilize the threshold distance as a reference for the timing of identifying the V2X components in each one of the geofencing areas 180(2) to 180(M-1). In various embodiments, the threshold distance is at least one geofencing area away from the first edge 340, for example, of the geofencing area 180 that includes the V2X components to be identified. For example, the identification of the V2X components in the assigned geofencing area 180(101) is performed when the responding emergency vehicle 120(1) is one geofencing area away from the first edge 340(101) of geofencing area 180(1). In this example, the identification of the detected V2X components 310(101) is performed when the responding emergency vehicle 120(1) crosses the adjacent geofencing area 180(1), which is about 150 meters (diameter of geofencing area 180) or less from the first edge 340(101) of the geofencing area 180(101). In this scenario, the timing of identifying the V2X components may improve the efficiency of identifying the V2X components that will receive the notifications 320 from the V2X server 170. In other cases where the geofencing area 180(100) is located within a certain distance from the geofencing area 180(101) i.e., not contiguous, the identification of the detected V2X components 310(101) is performed when the responding emergency vehicle 120(1) is detected by the V2X server 170 to be about 150 meters (diameter of geofencing area 180) or less from the perimeter (e.g., first edge 340) of the geofencing area 180(101).

Example V2X Server Components

Figure 4:
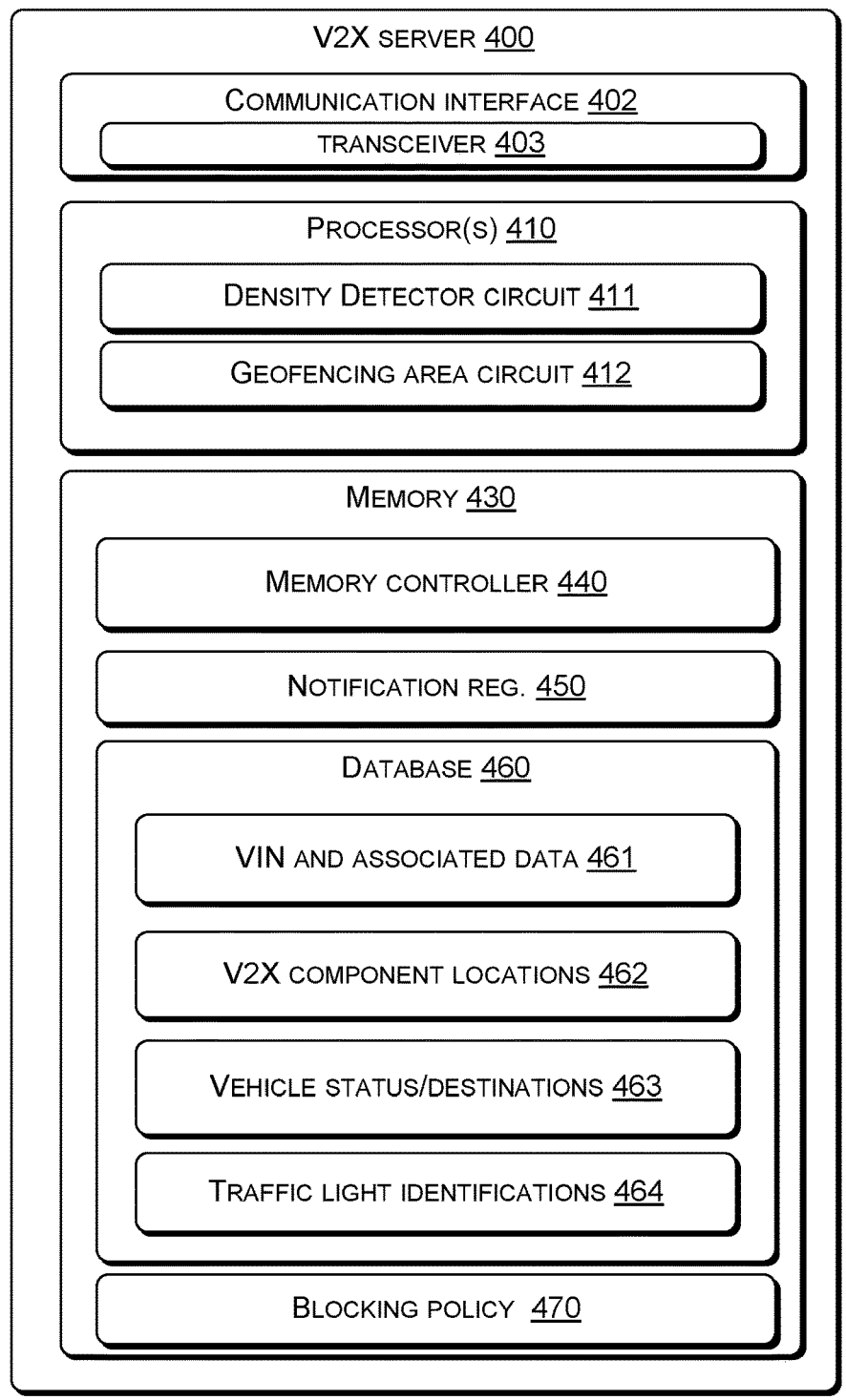
FIG. 4 is a block diagram showing various components of an illustrative device including the V2X server that implements a process for improving road safety use cases in the V2X communication environment.

FIG. 4 is a block diagram showing various components of an illustrative V2X server 400 that implements a process for improving safety use cases in the V2X communication environment. It is noted that the V2X server 400 as described herein can operate with more or fewer of the components shown herein. Additionally, the V2X server 400 shown herein or portions thereof can serve as a representation of one or more of the servers 400 of the present system.

V2X server 400 may include a communication interface 402, one or more processors 410, and a memory 430. Processors 410 may further include a density detector circuit 411 and a geofencing area circuit 412. Memory 430 further includes a memory controller 440, notification registers 450, an attribute database 460 including "VIN and associated data 461," "V2X component locations 462," "vehicle status/destinations 463," and "traffic light identifications 464." The memory 430 further includes the blocking policy 470.

Communication interface 402 may include hardware, software, or a combination of hardware and software that transmits and/or receives data from the dispatcher station 130 and the V2X components such as the devices 122, UEs 126, and the traffic lights 128. Communication interface 402 may include a transceiver 403 that facilitates wired or wireless communications through a cellular network or the broadband network. For example, the communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 5G (new radio), 3G (e. g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Transceiver 403 may include software, hardware, or a combination thereof, that can be used to process data and/or transmit/receive data. For example, the wireless transceiver 403 may receive data from the V2X components that include vehicle storage data, device identifications of traffic lights, UE locations/device identifications, and the like. In another example, the wired transceiver 403 may receive distress call information from the dispatcher station 130. In example embodiments, the communication interface 402 facilitates the relaying of the distress call information, notifications, and other information from the V2X server 170 to the V2X components.

Processor(s) 410 may be a central processing unit(s) (CPU), graphics processing unit(s) (GPU), both a CPU and GPU or any other sort of processing unit(s). Each of the one or more processor(s) 410 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 410 may also be responsible for executing all computer applications stored in the memory, which can be associated with common types of volatile (RAM) and/or non-volatile (ROM) memory. For example, the processor(s) 410 may process data that the V2X server 400 receives through the communication interface 402. In another example, the processor(s) 410 may use the communication interface 402 to send the notifications to the V2X components.

Density detector circuit 411 may include hardware, software, or a combination of hardware and software that identifies the V2X components in the assigned geofencing areas 180 that may receive notifications. Each device 122 in the V2X communications environment may be configured to periodically broadcast their vehicle storage data to the V2X server 400 through the radio interface 150. The V2X server 400 may parse the received vehicle storage data that are received from multiple vehicle-embedded devices and store them in the database 460. For example, the parsed vehicle storage data may include the hosting vehicle's VIN, projected path, estimated time of arrivals at different portions of the projected path, and other similar information. In another example, the parsed vehicle storage data may include device locations that can be stored in the "V2X component locations 462" while vehicle status, allusion to magnetometer data for directional/vector data and target destinations can be stored in "vehicle status/destinations 463." Similarly, the V2X server 400 may receive the UE locations from the base station 110, and the V2X server 400 stores the received UE locations in the "V2X component locations 462." Further, the traffic lights 128 and their corresponding locations may be pre-stored in the "V2X component locations 462." In example embodiments, the density detector circuit 411 utilizes the attribute database 460 to identify and to estimate the number of V2X components that are located in the assigned geofencing areas 180.

Geofencing area circuit 412 may include hardware, software, or a combination of hardware and software that assigns a plurality of calculated/precalculated geofencing areas along the projected path of the responding emergency vehicle. In various embodiments, the calculation of the geofencing areas is based upon the signal transmission range of the direct communication channel that is used for V2X communications. For example, the signal transmission range may extend to about 150 meters from the transmitting V2X component when the 5.9 GHz unlicensed band is used. In other cases, the signal transmission range may extend to more than 300 meters from the transmitting V2X component when the selected HF licensed band (e.g., 28 GHz) is used although such a high-frequency band may consume a high amount of power. In these cases, the shape and size of a calculated geofencing area is based upon the shape and size of the direct communication coverage area. In some embodiments, the geofencing areas are precalculated and stored in the geofencing areas register 175. In this case, the V2X server 170 maps the projected path to the stored geofencing areas and assigns the corresponding geofencing areas to the projected path of the responding emergency vehicle.

The memory 430 may be implemented using computer-readable media, such as computer-readable storage media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc—Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms. The memory 430 may also include a firewall. In some embodiment, the firewall may be implemented as a hardware in the V2X server 400.

Memory controller 440 may include hardware, software, or a combination thereof, that enables the memory 430 to interact with the communication interface 402, processor(s) 410, and other components of the V2X server 400. For example, the memory controller 440 may facilitate the retrieval of data from the "VIN and associated data 461," "V2X component locations 462," "vehicle status/destinations 463," and the "traffic light identifications 464" for the processor(s) 410. Similarly, memory controller 440 facilitates the storing of the vehicle storage data from the vehicles within the V2X communications environment. In various embodiments, the distress call information that includes the call timestamp and the distress location is stored in the attribute database 460.

Notification register 450 may include hardware, software, or a combination of hardware and software that stores the notifications including the current location of the responding emergency vehicle, classification, other characteristics of the responding emergency vehicle, and the like. Notification register 450 is similar to the notification register 176.

In example embodiments, the "vehicle status/destinations 463" store the distress location as the target destination of the responding emergency vehicle. In some cases, the active or inactive status of emergency vehicles is periodically transmitted to the V2X server 400. In this case, the V2X server 400 may relay the distress call information to the one or more emergency vehicles that are not actively pursuing an emergency. The different statuses of these emergency vehicles are stored in the "vehicle status/destinations 463."

Traffic light identifications 464 includes hardware, software, or a combination of hardware and software or register that stores the device identifications of the traffic lights. In various embodiments, the device identifications and the corresponding locations of the traffic lights within the V2X communications environment are pre-stored or preconfigured in the memory 430. In other cases, the V2X server 400 queries the identification of the traffic light that is configured to perform infrastructure-to-network communications with the V2X server 400. In this case, the traffic light device identification and the corresponding location are received and stored at the "traffic light identifications 464."

Example Process

Figure 5:
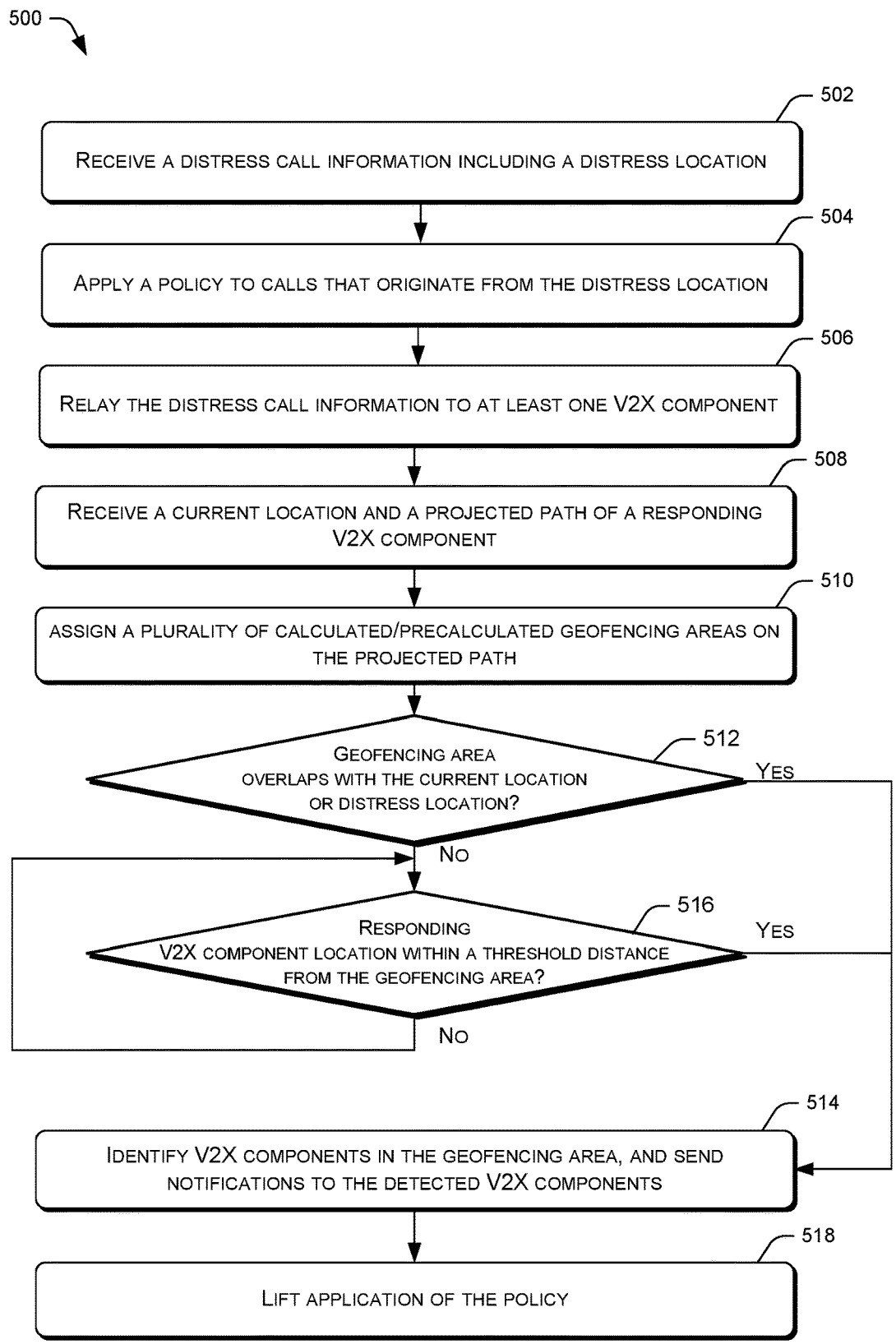
FIG. 5 is a flow diagram of an example process for improving road safety use cases in the V2X communication environment from a perspective of the V2X server.

FIG. 5 presents illustrative process 500 for improving road safety use cases in a V2X communication environment. The process 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process 500 is described with reference to FIGS. 1-4.

FIG. 5 is a flow diagram of an example process 500 for improving road safety use cases in a V2X communication environment from the perspective of the V2X server. At block 502, receiving distress call information including a distress location is performed. For example, a vehicle 120 (N) catches fire at the distress location 190, and a UE 126(N) is used by a caller to call the dispatcher station 130. In this example, the manned/unmanned dispatcher station 130 may encode the received information to form the distress call information. The formed distress call information is directly transmitted to the V2X server 170 through the cellular network or broadband network. At block 504, applying a policy to calls that originate from the distress location is performed. For example, the V2X server 170 applies the blocking policy 178 that may be implemented by the core network 140 and/or base station 110 to block the calls that originate from or within the vicinity of the distress location 190. In other cases, the blocking policy 178 may give the caller the option of following an instruction in the notification such as pressing another button (e.g., "Press #") to report another emergency or unrelated incident.

At block 506, relaying the distress call information to at least one V2X component is performed. For example, the V2X server 170 utilizes the communication interface 402 to transmit the distress call information to the V2X components that are classified as emergency vehicles. In this example, the V2X server 170 utilizes the "VIN and associated data 461" to obtain the vehicles that are classified as emergency vehicles. Further, the V2X server 170 utilizes the "V2X component locations 462" to obtain the location of the emergency vehicles. Further still, the V2X server 170 uses the "vehicle status/destinations 463" to determine the status of the emergency vehicles. At block 508, receiving a location and a projected path of a V2X component is performed. At block 510, assigning a plurality of calculated/precalculated geofencing areas on the projected path of the responding V2X component is performed.

At decision block 512, determining whether the assigned geofencing area overlaps with the current location of the responding V2X component or the distress location is performed. If the answer at decision block 512 is "Yes," then at block 514, identifying V2X components and sending of notifications to the identified V2X components in the geofencing area are performed. If the answer at decision block 512 is "No," then the process proceeds to decision block 516 to determine whether the responding V2X component is within a threshold distance of the geofencing area. If the answer at decision block 516 is "Yes," then at block 514, the identifying of the V2X components and sending of notifications to the identified V2X components in the geofencing area are performed. If the answer at decision block 516 is "No," then the process proceeds to loop back to decision block 516. At block 518, lifting the application of the policy is performed. For example, and in a case where the blocking policy 178 is applied to block the calls that originate from the distress location, the lifting of the blocking policy 178 includes the unblocking of the calls. In this example, the application of the blocking policy 178 is lifted after the sending of the notification 320(M) to the geofencing area 180(M). Alternatively, or additionally, the application of the blocking policy 178 may be lifted after expiration of a preset period of time from receipt of the distress call.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable storage media storing computer-executable instructions that upon execution cause one or more processors to perform acts comprising:

receiving a distress location, wherein the distress location is relayed to at least one vehicle-to-everything (V2X) component;

receiving a current location and a projected path of a responding V2X component;

assigning a plurality of contiguous geofencing areas along the projected path of the responding V2X component that include at least the geofencing area encompassing the current location of the responding V2X component, the geofencing area encompassing the distress location, and one or more intermediate geofencing areas between the geofencing area encompassing the current location of the responding V2X component and the geofencing area encompassing the distress location;

identifying V2X components in each of assigned geofencing areas of the plurality of contiguous geofencing areas that encompass either the current location of the responding V2X component or the distress location;

receiving an updated current location of the responding V2X component on the projected path;

identifying the V2X components in each of the intermediate geofencing areas when the responding V2X component is determined to be within a threshold distance of each of the intermediate geofencing areas based on a received periodically transmitted current location of the responding V2X component; and sending notifications to the identified V2X components.

2. The one or more non-transitory computer-readable storage media of claim 1 further comprising: applying a blocking policy to block calls that are originating from the geofencing area encompassing the distress location.

3. The one or more non-transitory computer-readable storage media of claim 2, wherein the applied blocking policy is lifted after the sending of the notification to the identified V2X components in the geofencing area encompassing the distress location.

4. The one or more non-transitory computer-readable storage media of claim 1, wherein the responding V2X component includes a vehicle that is classified as an emergency vehicle.

5. The one or more non-transitory computer-readable storage media of claim 1, wherein the V2X components include vehicle-embedded devices, a user equipment, and a traffic light.

6. The one or more non-transitory computer-readable storage media of claim 1, wherein the assigned contiguous geofencing areas include contiguous circular-shaped geofencing areas.

7. The one or more non-transitory computer-readable storage media of claim 6, wherein the circular-shaped geofencing area includes a radius that is equal to or less than one-half of a direct communication coverage area.

8. The one or more non-transitory computer-readable storage media of claim 1, wherein the threshold distance includes a minimum distance that is equal to a diameter of a circular-shaped geofencing area.

9. The one or more non-transitory computer-readable storage media of claim 1, wherein the notifications include the current location and the projected path of the responding V2X component.

10. A device, comprising:
a communication interface configured to transmit a distress location to at least one vehicle-to-everything (V2X) component, wherein the communication interface receives a current location and a projected path of a responding V2X component;
a processor coupled to the communication interface, the processor further comprising:
a geofencing area circuit configured to assign a plurality of geofencing areas along the projected path of the responding V2X component that include at least the geofencing area encompassing the current location of the responding V2X component, the geofencing area encompassing the distress location, and one or more intermediate geofencing areas between the geofencing area encompassing the current location of the responding V2X component and the geofencing area encompassing the distress location; and
a density detector circuit configured to identify V2X components in each of assigned one or more geofencing areas of plurality of contiguous geofencing areas that encompass either the current location of the responding V2X component or the distress location, wherein the density detector circuit identifies the V2X components in each of the intermediate geofencing areas when the responding V2X component is determined to be within a threshold distance of each of the intermediate geofencing areas based on a received periodically transmitted current location of the responding V2X component;
wherein notifications to the identified V2X components are sent through the communication interface.

11. The device of claim 10, wherein the processor is further configured to apply a blocking policy to block calls that are originating from the geofencing area that encompass the distress location.

12. The device of claim 11, wherein the applied blocking policy provides an instruction to report another emergency.

13. The device of claim 10, wherein the responding V2X component includes a vehicle that is classified as an emergency vehicle.

14. The device of claim 10, wherein the V2X components include vehicle-embedded devices, a user equipment, and a traffic light.

15. The device of claim 10, wherein assigned geofencing areas include contiguous circular-shaped geofencing areas.

16. The device of claim 15, wherein the circular-shaped geofencing area includes a radius that is equal to or less than one-half of a direct communication coverage area.

17. The device of claim 10, wherein the threshold distance includes a minimum distance that is equal to a diameter of the geofencing area.

18. A computer-implemented method, comprising:
receiving a distress location, wherein the distress location is relayed to at least one vehicle-to-everything (V2X) component;
receiving a current location and a projected path of a responding V2X component;
assigning a plurality of contiguous circular-shaped geofencing areas on the projected path of the responding V2X component that include at least the geofencing area encompassing the current location of the responding V2X component, the geofencing area encompassing the distress location, and one or more intermediate geofencing areas between the geofencing area encompassing the current location of the responding V2X component and the geofencing area encompassing the distress location;
identifying V2X components in each of assigned circular-shaped geofencing areas of the plurality of contiguous circular-shaped geofencing areas that encompass either the current location of the responding V2X component or the distress location;
identifying the V2X components in each of the intermediate circular-shaped geofencing areas when the responding V2X component is determined to be within a threshold distance of each of the intermediate circular-shaped geofencing areas based on a received periodically transmitted current location of the responding V2X component; and
sending notifications to the identified V2X components.

19. The computer-implemented method of claim 18, wherein the responding V2X component includes a vehicle that is classified as an emergency vehicle.

20. The computer-implemented method of claim 18, wherein the circular-shaped geofencing area includes a radius that is equal to or less than one-half of a direct communication coverage area.

* * * * *